United States Patent
Bandyopadhyay et al.

(10) Patent No.: US 9,441,529 B2
(45) Date of Patent: Sep. 13, 2016

(54) FUEL SYSTEM HAVING SEALED INJECTION PORT

(71) Applicant: Electro-Motive Diesel, Inc., LaGrange, IL (US)

(72) Inventors: Deep Bandyopadhyay, Naperville, IL (US); Farhan Devani, Morton Grove, IL (US); Edward John Cryer, Homer Glen, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 429 days.

(21) Appl. No.: 13/929,734

(22) Filed: Jun. 27, 2013

(65) Prior Publication Data

US 2015/0000640 A1    Jan. 1, 2015

(51) Int. Cl.

| F02M 69/04 | (2006.01) |
|---|---|
| F02M 21/02 | (2006.01) |
| F02B 13/00 | (2006.01) |
| F02B 3/00 | (2006.01) |
| F02B 25/06 | (2006.01) |
| F02D 19/06 | (2006.01) |

(52) U.S. Cl.
CPC ............ *F02B 25/06* (2013.01); *F02D 19/0642* (2013.01); *F02D 19/0694* (2013.01); *F02M 21/0275* (2013.01); *Y02T 10/32* (2013.01); *Y02T 10/36* (2013.01)

(58) Field of Classification Search
CPC .. F02M 61/14; F02M 69/465; F02M 61/145; F02M 13/08; F02M 21/02; F02B 43/00
USPC ................................ 123/470, 525, 575, 299
See application file for complete search history.

(56) References Cited

U.S. PATENT DOCUMENTS

| 946,406 A | 1/1910 | Söhnlein |
|---|---|---|
| 2,267,333 A | 12/1941 | Jacoby et al. |
| 2,367,029 A | 1/1945 | Jameson |
| 2,686,503 A | 8/1954 | Reddy et al. |
| 4,088,098 A | 5/1978 | Rose et al. |
| 4,091,772 A | 5/1978 | Heater et al. |
| 4,178,886 A | 12/1979 | Uchinishi |
| 4,353,333 A | 10/1982 | Iio |
| 4,527,516 A | 7/1985 | Foster |
| 4,579,093 A | 4/1986 | Eanes |
| 4,679,538 A | 7/1987 | Foster |
| 4,957,089 A | 9/1990 | Morikawa |
| 5,035,206 A | 7/1991 | Welch et al. |
| 5,251,580 A | 10/1993 | Torigai |

(Continued)

FOREIGN PATENT DOCUMENTS

| EP | 0432153 B1 | 6/1991 |
|---|---|---|
| EP | 2441941 A2 | 4/2012 |

(Continued)

*Primary Examiner* — Lindsay Low
*Assistant Examiner* — Syed O Hasan
(74) *Attorney, Agent, or Firm* — Finnegan, Henderson, Farabow, Garrett & Dunner, LLP

(57) ABSTRACT

A nozzle assembly for a gaseous fuel injector of an engine is disclosed. The nozzle assembly may include a gaseous fuel injector having a nozzle with a tip end. The nozzle assembly may also include a blocking member having an inner contact surface configured to receive a periphery of the nozzle at the tip end, and an outer contact surface configured to engage an air intake port of a cylinder and create a hermetic seal between the gaseous fuel injector and the air intake port.

15 Claims, 3 Drawing Sheets

(56) References Cited

U.S. PATENT DOCUMENTS

| | | |
|---|---|---|
| 5,271,357 A | 12/1993 | Hsu et al. |
| 5,357,919 A | 10/1994 | Ma |
| 5,517,954 A | 5/1996 | Melchior |
| 5,588,402 A | 12/1996 | Lawrence |
| 6,240,892 B1 | 6/2001 | Sweeney |
| 6,318,344 B1 | 11/2001 | Lucier et al. |
| 6,467,465 B1 * | 10/2002 | Lorts ............... F02D 19/0692 123/470 |
| 6,523,529 B1 | 2/2003 | Moncelle |
| 6,640,792 B2 | 11/2003 | Harvey et al. |
| 6,675,748 B2 | 1/2004 | Ancimer et al. |
| 7,021,558 B2 | 4/2006 | Chenanda et al. |
| 7,025,021 B1 | 4/2006 | Andersson et al. |
| 7,028,918 B2 | 4/2006 | Buchanan et al. |
| 7,090,145 B2 | 8/2006 | Baker et al. |
| 7,168,241 B2 | 1/2007 | Rudelt et al. |
| 7,207,321 B2 | 4/2007 | Vadimovitch et al. |
| 7,225,793 B2 | 6/2007 | Schwulst et al. |
| 7,343,895 B2 | 3/2008 | Mark |
| 7,363,888 B2 | 4/2008 | Klimmek et al. |
| 7,481,048 B2 | 1/2009 | Harmon et al. |
| 8,051,830 B2 | 11/2011 | Taylor |
| 8,056,326 B2 | 11/2011 | Cox et al. |
| 8,640,674 B2 * | 2/2014 | Sugiyama .......... F02M 21/0248 123/299 |
| 2004/0149255 A1 | 8/2004 | zur Loye et al. |
| 2009/0084346 A1 | 4/2009 | Zhou et al. |
| 2012/0073264 A1 | 3/2012 | Li et al. |
| 2012/0125294 A1 * | 5/2012 | Trembath ............ F02M 61/16 123/470 |

FOREIGN PATENT DOCUMENTS

| | | |
|---|---|---|
| JP | 56000518 | 1/1981 |
| JP | 5202756 A | 8/1993 |
| WO | WO 2011/002351 A1 | 1/2011 |
| WO | WO 2011/002353 A1 | 1/2011 |
| WO | WO 2011/139932 A1 | 11/2011 |

* cited by examiner

FUEL SYSTEM HAVING SEALED INJECTION PORT

TECHNICAL FIELD

The present disclosure is directed to a fuel system and, more particularly, to a fuel system having a sealed injection port.

BACKGROUND

Due to the rising cost of liquid fuel (e.g. diesel fuel) and ever increasing restrictions on exhaust emissions, engine manufacturers have developed dual-fuel engines. An exemplary dual-fuel engine provides injections of a low-cost gaseous fuel (e.g. natural gas) through air intake ports of the engine's cylinders. The gaseous fuel is introduced with clean air that enters through the same intake ports and is ignited by liquid fuel that is injected separately during each combustion cycle. Because a lower-cost fuel is used together with liquid fuel, cost efficiency may be improved. In addition, the combustion of the gaseous and liquid fuel mixture may result in a reduction of harmful emissions.

An exemplary dual fuel engine is disclosed in U.S. Pat. No. 5,035,206 that issued to Welch et al. on Jul. 30, 1991. In particular, the '206 patent discloses a dual-fuel engine having an injector for injecting natural gas into its cylinders to mix with separately-injected diesel fuel. A quantity of natural gas is injected through a delivery conduit into each cylinder at a time when an associated piston uncovers an end of the delivery conduit.

In some dual-fuel applications, especially with two-stroke dual-fuel engines, gaseous fuel injectors can experience leakage through their nozzles. For instance, after injection, a quantity of gaseous fuel may still remain inside the nozzle, and a portion of the gaseous fuel can escape from the nozzle as a result of low pressure areas surrounding the nozzle. This leaked gaseous fuel can slip into an air box of the engine and/or slip into the combustion chamber prematurely and be exhausted through exhaust ports of the engine's cylinder. In these situations, the leaked gaseous fuel does not contribute to the combustion process, resulting in poor fuel efficiency and costly fueling losses.

The disclosed fuel system is directed to overcoming one or more of the problems set forth above and/or other problems of the prior art.

SUMMARY

In one aspect, the present disclosure is directed to a nozzle assembly. The nozzle assembly may include a gaseous fuel injector having a nozzle with a tip end. The nozzle assembly may also include a blocking member having an inner contact surface configured to receive a periphery of the nozzle at the tip end, and an outer contact surface configured to engage an air intake port of a cylinder and create a hermetic seal between the gaseous fuel injector and the air intake port.

In another aspect, the present disclosure is directed to a blocking member for an air intake port associated with a gaseous fuel injector of an engine. The blocking member may include a generally rectangular body having an outer contact surface configured to engage a port wall associated with the air intake port. The blocking member may also include a centrally-located aperture formed in the body and configured to receive a nozzle of the gaseous fuel injector.

In yet another aspect, the present disclosure is directed to a fuel system for an engine having a cylinder with a plurality of radial air intake ports. The fuel system may include a liquid fuel injector configured to inject liquid fuel into the cylinder. The fuel system may also include a gaseous fuel injector configured to inject gaseous fuel into the cylinder via one of the plurality of radial air intake ports and including a nozzle in direct communication with the one of the plurality of air intake ports. The fuel system may further include a blocking member. The blocking member may include a generally rectangular body having an outer contact surface configured to engage a port wall associated with the one of the plurality of air intake ports. The blocking member may also include a centrally-located aperture formed in the body and configured to receive a nozzle of the gaseous fuel injector.

DETAILED DESCRIPTION

Figure 1:
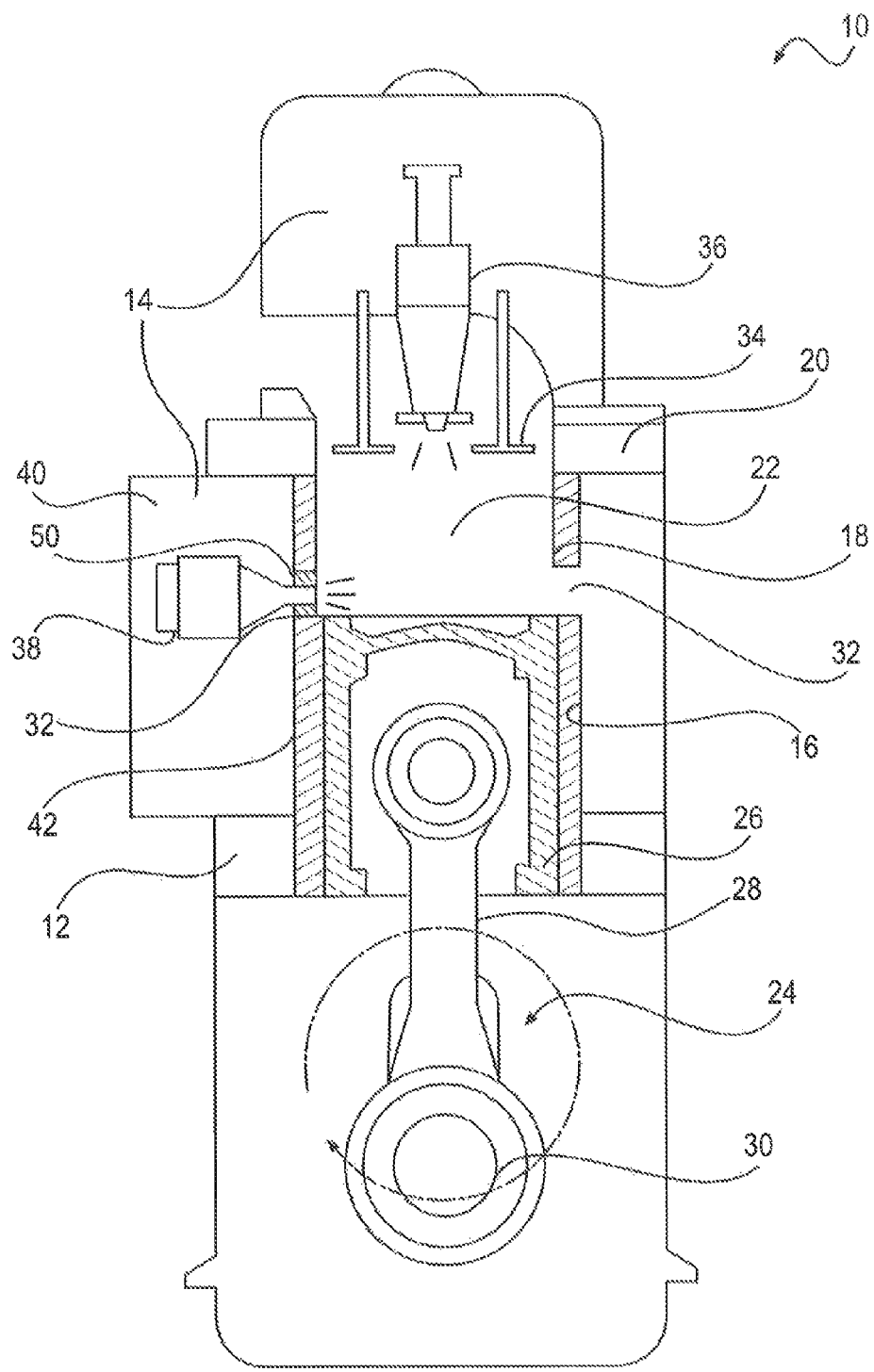
FIG. 1 is a cross-sectional illustration of an engine equipped with an exemplary disclosed fuel system.

FIG. 1 illustrates an exemplary internal combustion engine 10. Engine 10 is depicted and described as a two-stroke dual-fuel engine. Engine 10 may include an engine block 12 that at least partially defines a plurality of cylinders 16 (only one shown), each having an associated cylinder head 20. A cylinder liner 18 may be disposed within each engine cylinder 16, and cylinder head 20 may close off an end of liner 18. A piston 24 may be slidably disposed within each cylinder liner 18, Each cylinder liner 18, cylinder head 20, and piston 24 may together define a combustion chamber 22 that receives fuel from a fuel system 14 mounted to engine 10. It is contemplated that engine 10 may include any number of engine cylinders 16 with corresponding combustion chambers 22.

Within engine cylinder liner 18, piston 24 may be configured to reciprocate between a bottom-dead-center (BDC) or lower-most position, and a top-dead-center (TDC) or upper-most position. In particular, piston 24 may be an assembly that includes a piston crown 26 pivotally connected to a rod 28, which may in turn be pivotally connected to a crankshaft 30. Crankshaft 30 of engine 10 may be rotatably disposed within engine block 12 and each piston 24 coupled to crankshaft 30 by rod 28, so that a sliding motion of each piston 24 within liner 18 results in a rotation of crankshaft 30. Similarly, a rotation of crankshaft 30 may result in a sliding motion of piston 24. As crankshaft 30 rotates through about 180 degrees, piston crown 26 and connected rod 28 may move through one full stroke between BDC and TDC. Engine 10, being a two-stroke engine, may have a complete cycle that includes a power/exhaust/intake stroke (TDC to BDC) and an intake/compression stroke (BDC to TDC).

During a final phase of the power/exhaust/intake stroke described above, air may be drawn into combustion chamber 22 via one or more gas exchange ports (e.g., air intake ports) 32 located within a sidewall of cylinder liner 18. In particular, as piston 24 moves downward within liner 18, a position will eventually be reached at which air intake ports 32 are no longer blocked by piston 24 and instead are fluidly communicated with combustion chamber 22. When air intake ports 32 are in fluid communication with combustion chamber 22 and a pressure of air at air intake ports 32 is greater than a pressure within combustion chamber 22, air will pass through air intake ports 32 into combustion chamber 22. It is contemplated that gaseous fuel (e.g. methane or natural gas) may be introduced into combustion chamber 22 (e.g. radially injected) through at least one of air intake ports 32. The gaseous fuel may mix with the air to form a fuel/air mixture within combustion chamber 22.

Eventually, piston 24 will start an upward movement that blocks air intake ports 32 and compresses the air/fuel mixture. As the air/fuel mixture within combustion chamber 22 is compressed, a temperature of the mixture may increase. At a point when piston 24 is near TDC, a liquid fuel (e.g. diesel or other petroleum-based liquid fuel) may be injected into combustion chamber 22 via a liquid fuel injector 36. The liquid fuel may be ignited by the hot air/fuel mixture, causing combustion of both types of fuel and resulting in a release of chemical energy in the form of temperature and pressure spikes within combustion chamber 22. During a first phase of the power/exhaust/intake stroke, the pressure spike within combustion chamber 22 may force piston 24 downward, thereby imparting mechanical power to crankshaft 30. At a particular point during this downward travel, one or more gas exchange ports (e.g., exhaust ports) 34 located within cylinder head 20 may open to allow pressurized exhaust within combustion chamber 22 to exit and the cycle will restart.

Liquid fuel injector 36 may be positioned inside cylinder head 20 and configured to inject liquid fuel into a top of combustion chamber 22 by releasing fuel axially towards an interior of cylinder liner 18 in a generally cone-shaped pattern. Liquid fuel injector 36 may be configured to cyclically inject a fixed amount of liquid fuel, for example, depending on a current engine speed and/or load. In one embodiment, engine 10 may be arranged to run on liquid fuel injections alone or a smaller amount of liquid fuel mixed with the gaseous fuel. The gaseous fuel may be injected through air intake port 32 into combustion chamber 22 via any number of gaseous fuel injectors 38.

Gaseous fuel injector 38 may be positioned inside an air box 40 of engine 10 and configured to inject gaseous fuel radially into combustion chamber 22 through a corresponding air intake port 32 after the air intake port 32 is opened by movement of piston 24. Gaseous fuel injector 38 may be positioned adjacent a wall 42 of engine block 12, such that a nozzle of gaseous fuel injector 38 is in direct communication with one of air intake ports 32 of an adjacent engine cylinder 16. It is contemplated that there may be mounting hardware (not shown) to mount gaseous fuel injector 38 to wall 42 and/or directly to cylinder liner 18, such that gaseous fuel injector 38 is positioned at air intake port 32. Fuel system 14 may further include at least one fuel supply line (not shown) connected to gaseous fuel injector 38. The supply line may be positioned inside air box 40 and be connected to a fuel tank or other container configured to serve as a fuel reservoir.

Figure 2:
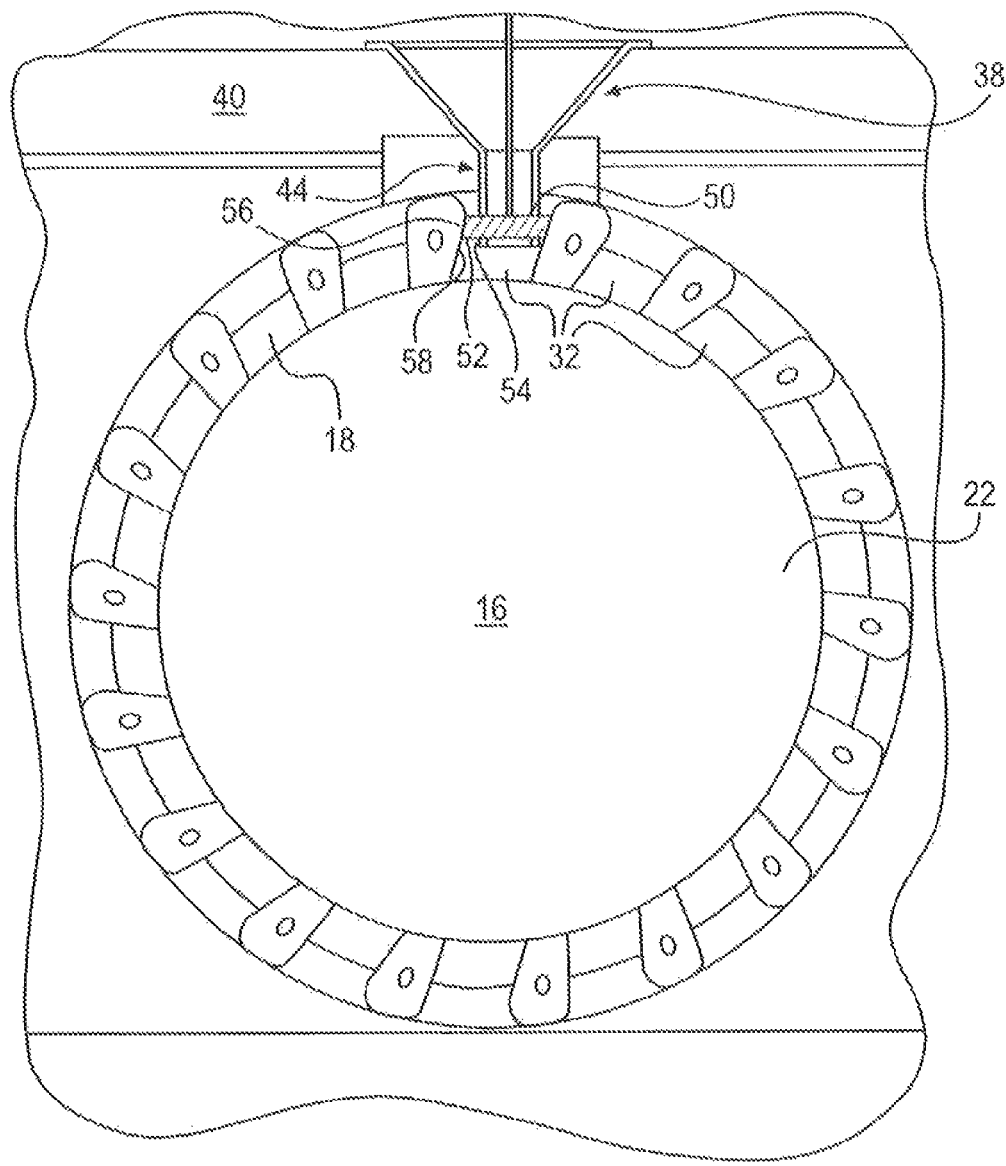
FIG. 2 is a top-view illustration inside of an exemplary disclosed cylinder that may be used in conjunction with the engine of FIG. 1.

FIG. 2 illustrates a top view inside of cylinder 16. Cylinder 16 may include a plurality of air intake ports 32 located circumferentially around cylinder liner 18. Gaseous fuel injectors 38 may be placed in one or more of air intake ports 32 to inject fuel with a flow of air. Although only one gaseous fuel injector 38 is shown to be associated with cylinder 16 in FIG. 2, it is contemplated that any number of gaseous fuel injectors 38 may be associated with cylinder 16, as desired.

As shown in FIG. 2, gaseous fuel injector 38 may include a nozzle 44 in direct communication with a single air intake port 32. Nozzle 44 may have a pressurized chamber (not shown) configured to contain a volume of pressurized fuel. Gaseous fuel injector 38 may further include a needle valve element (not shown) that is slidably disposed within the pressurized chamber. In response to a deliberate injection requirement, the needle valve element moves to allow the pressurized fuel to flow from the pressurized chamber into combustion chamber 22 of engine 10. In some applications, before, during, and/or after injection, a quantity of fuel contained within the pressurized chamber may leak out of nozzle 44.

To help reduce an amount of leaked fuel that enters air box 40, each air intake port 32 associated with gaseous fuel injector 38 may be sealed around nozzle 44. This seal may prevent fluid communication (e.g., air flow) between combustion chamber 22 and air box 40 through the same air intake port 32. In particular, a blocking member 50 may be disposed around a tip end of nozzle 44, within air intake port 32. Together, blocking member 50 and nozzle 44 may form a nozzle assembly. Blocking member 50 may have an inner contact surface 52 configured to receive a periphery 54 of nozzle 44 at its tip end, and an outer contact surface 56 configured to engage a port wall 58 at air intake port 32. Inner contact surface 52 may engage periphery 54 of nozzle 44, such that only a portion of the tip end is exposed to combustion chamber 22. Outer contact surface 52 may engage port wall 58 to create a hermetic seal between gaseous fuel injector 38 and air intake port 32. As a result, blocking member 50 may allow gaseous fuel to be injected into combustion chamber 22, but at the same time, inhibit leaked gaseous fuel from flowing from the tip end of nozzle 44 into air box 40. Blocking member 50 may also block air from flowing from air box 40 through the respective air intake port 32 and pushing leaked gaseous fuel into combustion chamber 22 prematurely.

In the disclosed embodiment, blocking member 50 is made from cast iron, though other materials may also be used in other embodiments, if desired. It is contemplated that nozzle 44 and/or port wall 58 may be made of similar materials as blocking member 50 to mitigate problems with thermal expansion of the materials. In some embodiments, inner and/or outer contact surfaces 52, 56 may be welded to nozzle 44 and/or port wall 58, respectively, to seal the respective interfaces. In other embodiments, the engagement between inner and outer contact surfaces 52, 56 and nozzle 44 and/or port wall 58 may be a tight interference fit (e.g., press-fit). It is contemplated, however, that the engagement between inner and outer contact surfaces 52, 56 and nozzle 44 and/or port wall 58 may include any combination of welding and press-fit connections. For instance, blocking member 50 may be machined and welded to nozzle 44, such that blocking member 50 may be press-fit into port wall 58. It is also contemplated that a separate part (e.g., a ring) may have a first surface that is welded to inner contact surface 52 of blocking member 50 and a second surface that is press-fit over the tip end of nozzle 44. Similarly, it is further contemplated that another separate part (e.g., a ring) may have a first surface that is welded to outer contact surface 56 of blocking member 50 and a second surface that is press-fit with port wall 58. The use of one or more separate rings (or similar parts) may be useful in some retrofit applications. In other embodiments, instead of welding and/or press-fitting outer contact surface 56 to port wall 58, blocking member 50 may instead be integral with port wall 58, such that blocking member 50 is part of the as-cast cylinder liner 18. The use of an as-cast blocking member 50 may reduce time and costs associated with manufacturing and/or assembly.

As shown in FIG. 2, the air intake port 32 associated with gaseous fuel injector 38 may be the only air intake port 32 that is sealed off. The remaining air intake ports 32 may be fully open to allow air to pass between air box 40 and combustion chamber 22 through the open air intake ports 32, after the air intake ports 32 are opened by movement of piston 24. It is contemplated, however, that in other embodiments having multiple gaseous fuel injectors 38, there may be a blocking member 50 associated with each gaseous fuel injector 38. It is further contemplated that, in some embodiments, one or more of the remaining air intake ports (not associated with gaseous fuel injectors 38) may be completely sealed off with a blocking member, in order to control a volume of air flow passing between air box 40 and combustion chamber 22.

Figure 3:
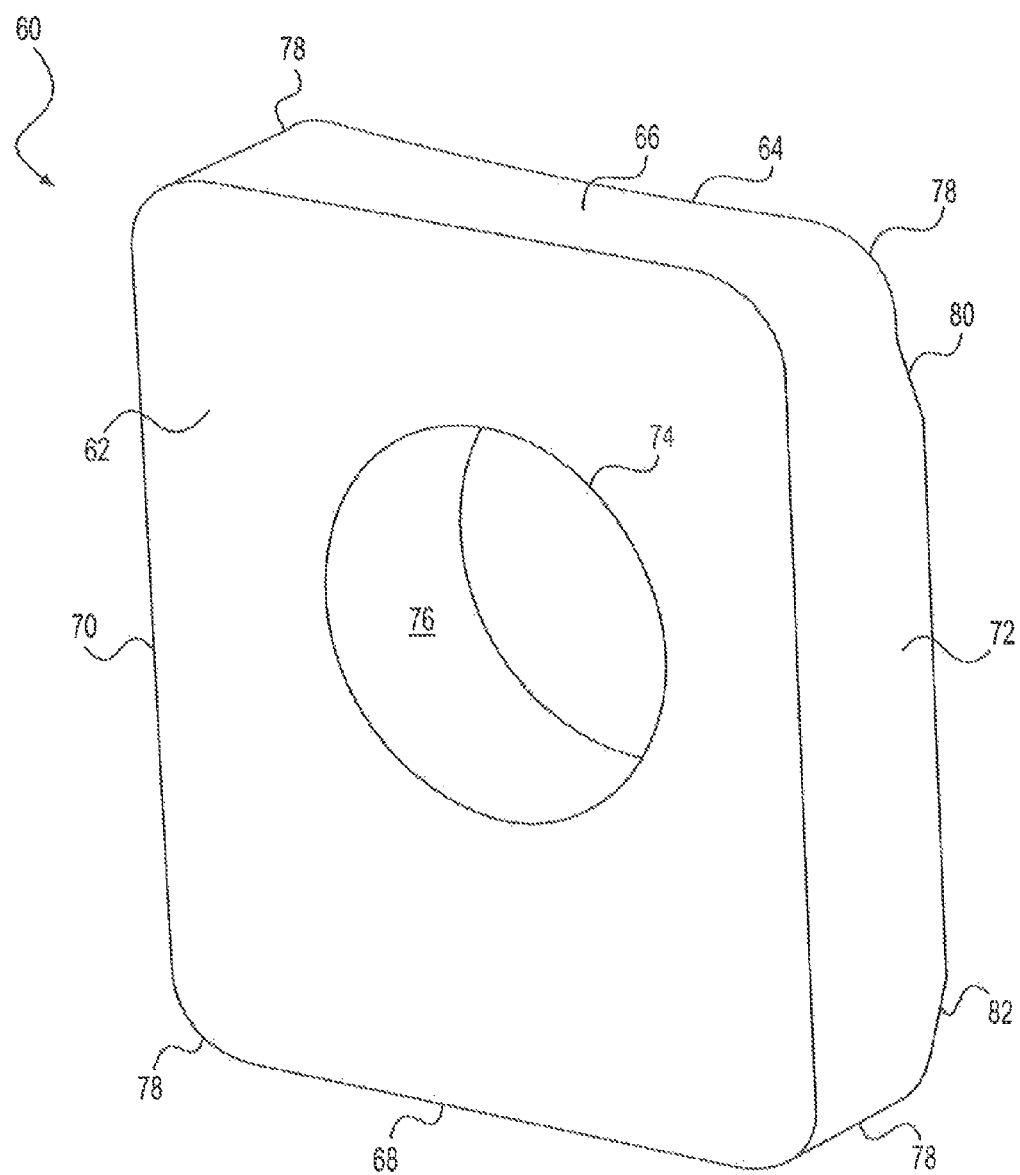
FIG. 3 is a pictorial illustration of an exemplary disclosed blocking member that may be used in conjunction with the fuel system of FIG. 1.

FIG. 3 illustrates a pictorial view of an exemplary disclosed blocking member 60. Blocking member 60 may include an inner face 62 oriented toward combustion chamber 22 and an oppositely disposed outer face 64 oriented toward air box 40. Blocking member 60 may also include at least one outer contact surface configured to engage port wall 58 associated with air intake port 32. In the disclosed embodiment, air intake port 32 is substantially rectangular, and therefore, blocking member 60 is also generally rectangular. Specifically, blocking member 60 may have four outer surfaces, including a top surface 66, a bottom surface 68, and side surfaces 70, 72. Top surface 66 may be substantially parallel and opposite to bottom surface 68, while side surfaces 70, 72 may be substantially parallel and opposite to each other. It should be noted that top surface 66 and bottom surface 68 may be substantially perpendicular to side surfaces 70, 72.

In the disclosed embodiment, an outer shape of blocking member 60 substantially matches an inner shape of air intake port 32 (i.e., outer dimensions of blocking member 60 may be about equal to outer dimensions of port wall 58). For example, in one embodiment, blocking member 60 may have a length of about 2.6 inches between top surface 66 and bottom surface 68. Blocking member 60 may also have a width of about 2.2 inches between side surface 70 and side surface 72, and a thickness of about 0.8 inches between inner face 62 and outer face 64. In some embodiments, the length and width of blocking member 60 may be 0-10% greater than the length and width of port wall 58, allowing blocking member 60 to be press-fit into air intake port 32.

In some embodiments, blocking member 60 may also include at least one rounded corner 78. As shown in FIG. 3, blocking member 60 may have four rounded corners 78. The use of rounded corners 78 may help to match the outer dimensions of blocking member 60 to the outer dimensions of port wall 58. For instance, in some embodiments, air intake port 32 may have rounded corners, and in order to be welded or press-fitted properly, blocking member 60 may be equipped with rounded corners 78 as well.

Blocking member 60 may also include at least one aperture 74 configured to receive nozzle 44. Aperture 74 may be centrally-located in blocking member 60. In the disclosed embodiment, nozzle 44 is substantially circular, and therefore, aperture 74 is substantially circular as well. It is contemplated, however, that aperture 74 may be manufactured to accommodate various shapes and/or sizes of nozzle 44, as desired. At aperture 74, blocking member 60 may have an annular surface 76 configured to receive periphery 54 of nozzle 44. In one embodiment, annular surface 76 may have a diameter of about 0.6 inches, which substantially matches a diameter of periphery 54. In some embodiments, the diameter of annular surface 76 may be about 0-10% smaller than the diameter of periphery 54 of nozzle 44, allowing blocking member 60 to be press-fit over nozzle 44.

In some embodiments, blocking member 60 may include at least one bevel. As shown in FIG. 3, blocking member 60 includes an upper bevel 80 and a lower bevel 82 located at outer face 64 oriented toward air box 40. Upper and lower bevels 80, 82 may help reduce costs associated with manufacturing by reducing an amount of material used to produce blocking member 60. Upper and lower bevels 80, 82 may also provide additional surfaces to aid in assembly and disassembly of press-fit connections. However, it is contemplated that, blocking member 60 may alternatively have geometry other than a bevel or not be equipped with any bevels at all, if desired.

INDUSTRIAL APPLICABILITY

The disclosed fuel system may be implemented into any engine application. The disclosed fuel system may prevent fueling losses associated with gaseous fuel leakage. Specifically, blocking member 60 may engage nozzle 44 of gaseous fuel injector 38 and air intake port 32, to help prevent fluid communication between combustion chamber 22 and air box 40 through its respective air intake port 32. By sealing air intake port 32 associated with gaseous fuel injector 38, gaseous fuel may be inhibited from slipping into air box 40. In addition, blocking member 60 may inhibit air from flowing through its associated air intake port 32, thus reducing an amount of leaked gaseous fuel being pushed into combustion chamber 22 prematurely and exiting through exhaust ports 34 without being used in the combustion process. Accordingly, blocking member 60 may conserve fuel, thereby increasing fuel efficiency and reducing operating costs.

It will be apparent to those skilled in the art that various modifications and variations can be made to the disclosed engine and fuel system. Other embodiments will be apparent to those skilled in the art from consideration of the specification and practice of the disclosed fuel system. It is intended that the specification and examples be considered as exemplary only, with a true scope being indicated by the following claims and their equivalents.

What is claimed is:

1. A fuel system for an engine having a cylinder with a plurality of radial air intake ports located circumferentially around a cylinder liner, the fuel system comprising:
a liquid fuel injector positioned inside a cylinder head associated with the cylinder and configured to inject liquid fuel axially into the cylinder;
a gaseous fuel injector positioned inside an air box of the engine and configured to inject gaseous fuel radially into the cylinder via one of the plurality of radial air intake ports and including a nozzle in direct communication with the one of the plurality of radial air intake ports; and
a blocking member including:
a generally rectangular body having an outer contact surface configured to engage a port wall associated with the one of the plurality of radial air intake ports; and
a centrally-located aperture formed in the body and configured to receive the nozzle of the gaseous fuel injector, wherein one or more remaining radial air intake ports are fully open to allow air to pass between the air box and the cylinder after movement of a piston of the engine.

2. The fuel system of claim 1, wherein the nozzle of the gaseous fuel injector includes a tip end, and only a portion of the tip end is exposed to an interior of the cylinder.

3. The fuel system of claim 1, wherein the centrally located aperture is substantially circular.

4. The fuel system of claim 1, wherein an annular surface of the centrally located aperture is welded to the periphery of the nozzle.

5. The fuel system of claim 1, wherein an annular surface of the centrally located aperture is press-fit over the periphery of the nozzle.

6. The fuel system of claim 1, wherein the outer contact surface of the blocking member is welded to the port wall associated with the one of the plurality of radial air intake ports.

7. The fuel system of claim 1, wherein the outer contact surface of the blocking member is press-fit with the port wall associated with the one of the plurality of radial air intake ports.

8. The fuel system of claim 1, wherein the generally rectangular body of the blocking member is made from cast-iron.

9. The fuel system of claim 1, wherein at least one of the port wall associated with the one of the plurality of radial air intake ports and the nozzle of the gaseous fuel injector are also made from cast-iron.

10. The fuel system of claim 1, wherein the centrally located aperture has a diameter that is about 0-10% smaller than a diameter of the nozzle.

11. The fuel system of claim 1, wherein the rectangular body has a length and width that are about 0-10% larger than a length and width of the port wall associated with the one of the plurality of radial air intake ports.

12. The fuel system of claim 1, further including at least one rounded corner formed in the outer contact surface of the generally rectangular body.

13. The fuel system of claim 1, further including at least one bevel located on a face of the rectangular body and configured to be oriented towards an air box of the engine.

14. The fuel system of claim 1, wherein the nozzle of the gaseous fuel injector includes a tip end, and the centrally located aperture of the blocking member is only configured to receive the tip end of the nozzle.

15. The fuel system of claim 1, wherein the blocking member includes:
an inner face oriented towards an interior of the cylinder;
an outer face opposite the inner face and oriented towards an air box associated with the cylinder;
a top surface perpendicular to the inner and outer faces;
a bottom surface opposite and substantially parallel to the top surface; and
two opposing side surfaces that are substantially parallel with each other and perpendicular to the top and bottom surfaces and to the inner and outer faces.

* * * * *

UNITED STATES PATENT AND TRADEMARK OFFICE
CERTIFICATE OF CORRECTION

PATENT NO. : 9,441,529 B2  
APPLICATION NO. : 13/929734  
DATED : September 13, 2016  
INVENTOR(S) : Bandyopadhyay et al.

Page 1 of 1

It is certified that error appears in the above-identified patent and that said Letters Patent is hereby corrected as shown below:

In the Claims

Column 8, Line 1, In Claim 10, delete "The fuel system of claim 1," and insert -- The fuel system of claim 3, --.

Signed and Sealed this
Tenth Day of January, 2017

Michelle K. Lee
*Director of the United States Patent and Trademark Office*